United States Patent [19]
Fanelli et al.

[11] Patent Number: 4,783,964
[45] Date of Patent: Nov. 15, 1988

[54] PNEUMATIC BRAKE BOOSTER WITH LOAD REACTION CARRYING MEMBERS

[75] Inventors: Michael W. Fanelli, Centerville; Schuyler S. Shaw, New Carlisle, both of Ohio

[73] Assignee: General Motors Corporation, Detroit, Mich.

[21] Appl. No.: 465,629

[22] Filed: Feb. 10, 1983

[51] Int. Cl.⁴ ............................................. B60T 13/46
[52] U.S. Cl. ...................................... 60/547.1; 92/169
[58] Field of Search .................... 60/547.1; 92/169 A, 92/169 B, 169 C, 169 R

[56] References Cited

U.S. PATENT DOCUMENTS

| | | | |
|---|---|---|---|
| 3,738,232 | 6/1973 | Kado | 92/161 X |
| 4,246,755 | 1/1981 | Weiler | 60/594 X |
| 4,377,069 | 3/1983 | Kobayashi | 60/547.1 |
| 4,487,022 | 12/1984 | Kytta | 60/547.1 |

FOREIGN PATENT DOCUMENTS

| | | | |
|---|---|---|---|
| 294723 | 12/1967 | Australia | 60/547.1 |
| 56-120444 | 9/1981 | Japan | 92/169 |
| 2082704 | 3/1982 | United Kingdom | 92/169 |
| 2087498 | 5/1982 | United Kingdom | 92/169 |

Primary Examiner—Robert E. Garrett
Assistant Examiner—George Kapsalas
Attorney, Agent, or Firm—D. D. McGraw

[57] ABSTRACT

A power brake booster has booster load carrying members which are separate from the booster housings walls so that they take the load reaction from the master cylinder outside of the booster housing. This separates the differential pressure chamber wall functions and the booster load carrying member function.

3 Claims, 1 Drawing Sheet

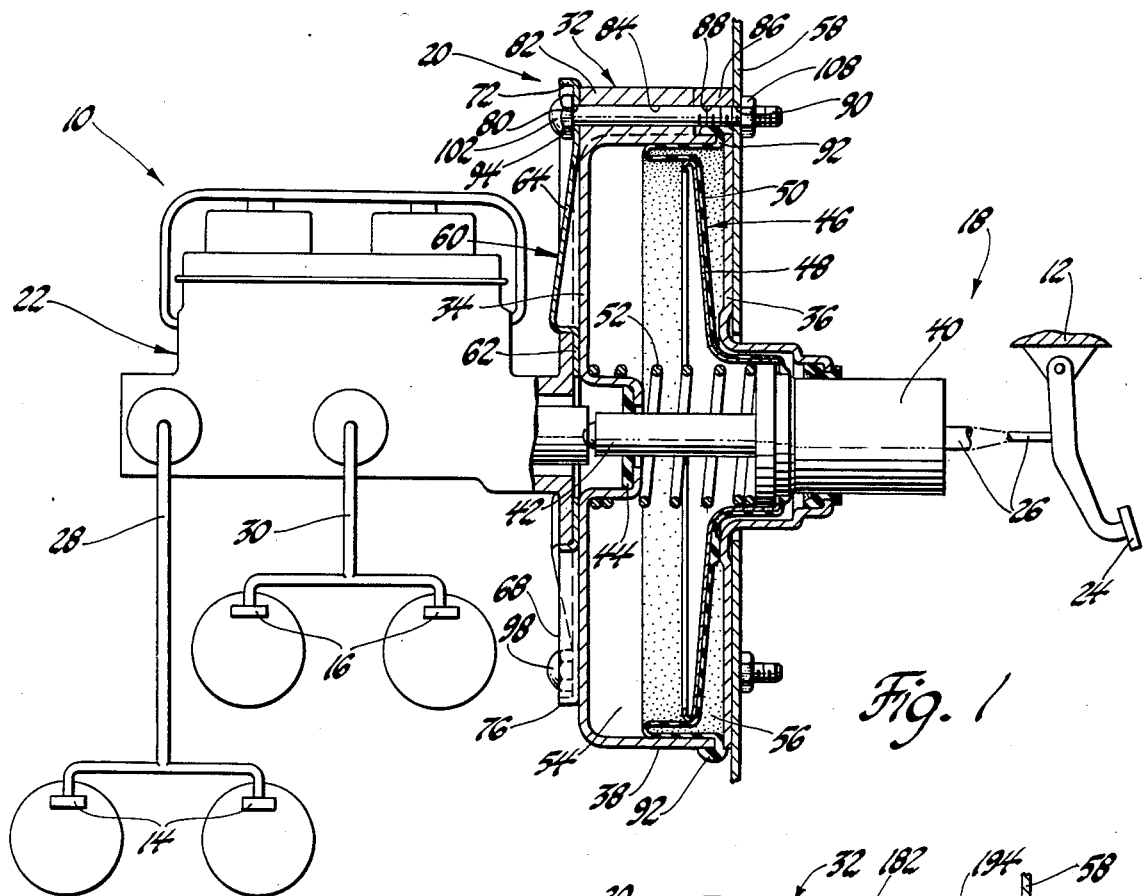

PNEUMATIC BRAKE BOOSTER WITH LOAD REACTION CARRYING MEMBERS

The invention relates to a power brake booster in which the load reaction from the master cylinder is taken by load carrying members outside of the booster housing, separating the load carrying function and the differential pressure chamber defining function of the housing. This construction permits the use of light weight housing components and provides sufficiently strong load carrying members which, combined with the housing components, results in a lighter weight booster assembly than typical current production boosters which transmit the load through the housing. It is also a feature of the invention to use tie bolts as load carrying members which not only hold the various housing components together but also function as mounting bolts supporting the booster and its master cylinder. The booster may be mounted directly to a vehicle body panel which also functions as one of the booster load carrying members. None of the load carrying members, and particularly the tie bolts, pass through the booster differential pressure chambers. This eliminates a complex arrangement of seals and other components when internal tie bolts and tubes are provided to transmit loads separately from a light weight housing, and simplifies assembly.

BRIEF DESCRIPTION OF THE DRAWING

FIG. 1 is a schematic representation of a vehicle brake system having a booster embodying the invention, the booster having a single diaphragm power wall and being illustrated in section with parts broken away.

FIG. 2 is an elevation view of the booster of FIG. 1 with the master cylinder removed and illustrating in greater detail one of the booster load carrying members.

FIG. 3 is a cross-section view of a tandem diaphragm brake booster which is a modification of the booster illustrated in FIG. 1.

DETAILED DESCRIPTION OF THE PREFERRED EMBODIMENT

The brake system 10 of FIG. 1 is illustrated as being installed in a vehicle 12 having wheel brake sets 14 and 16. The power brake assembly 18 includes a brake booster 20 and a master cylinder 22. The power brake assembly is actuated in a controlled manner by the vehicle operator through the brake pedal 24 and push rod 26. The master cylinder delivers pressurized brake actuating fluid to wheel brake set 14 through brake line circuit 28 and to wheel brake set 16 through brake line circuit 30.

The brake booster 20 has a housing 32 defined by a front wall 34, a rear wall 36 and a circumferentially extending peripheral wall 38. A suitable piston and valve assembly 40 is positioned in the rear wall 36 and receives the input push rod 26 for valve operation. A booster output member in the form of a push rod 42 extends from the piston and valve assembly through a seal 44 supported by front wall 34 and engages the master cylinder 22 to pressurize fluid therein in the usual manner. A power wall 46 is formed by an annular support plate 48 secured to the piston portion of assembly 40 and an annular diaphragm 50 with its inner periphery secured to the piston portion of assembly 40. The outer periphery of the diaphragm is secured between housing walls 36 and 38, and its center section engages support plate 48. A power wall return spring 52 is contained in the constant pressure chamber 54 formed by front wall 34, power wall 46 and a part of circumferential wall 38. A variable pressure chamber 56 is defined by rear wall 36 and power wall 46. It may also be defined by rear wall 36 and pwer wall 46. It may also be defined by a part of circumferential wall 38.

The booster 20 has a separate booster load carrying arrangement which includes the vehicle body panel 58. Panel 58 is a mount for power brake assembly 18 as well as a booster load carrying member. The booster load carrying member 58 is in juxtaposition to rear wall 36. Another booster load carrying member 60 is located in juxtaposition to front wall 34. As is more particularly shown in FIG. 2, member 60 has a center portion 62 provided with radially extending arms 64, 66, 68 and 70. The respective outer ends 72, 74, 76, and 78 of these arms extend radially beyond the outer surface of circumferential wall 38 and are provided with bolt passages, one such bolt passage 80 being shown in FIG. 1. While four such arms are illustrated, other numbers of arms may be used depending upon design factors. Of course, a plurality of such arms are required.

Bosses are formed on the housing peripheral wall 38 outside of the maximum radial extension of the differential pressure chambers 54 and 56, one such boss 82 being illustrated in FIG. 1. Each of these bosses is aligned with an arm outer end and has a bolt passage 84 in alignment with each bolt passage 80. A somewhat similar boss is provided on the outer periphery of rear wall 36, one such boss 86 being illustrated in FIG. 1. Boss 86 and similar bosses may also be considered to be a part of the peripheral wall 38 in a manner similar to the arrangement wherein the major portion of peripheral wall 38 and the bosses 82 are extensions of front wall 34. Each boss 86 has a bolt passage 88 formed therethrough in alignment with passages 80 and 84 at each arm outer end, and the booster load carrying member 58 has bolt passages 90 formed therethrough in alignment with the earlier named bolt passages.

The diaphragm 50 has a sealing and retaining flange 92 on its outer periphery which fits between peripheral wall 38 and rear wall 36 in a suitable manner so that when the housing is assembled the outer periphery of the diaphragm is retained in position and seals the joint between the adjacent housing walls.

A threaded booster load carrying member is composed of bolts 94, 96, 98 and 100. All of the bolts are similarly assembled, and bolt 94 is particularly illustrated in its assembled position in FIG. 1. The bolt head 102 seats against the outer side of booster load carrying member arm outer end 72 and the bolt shank extends through bolt passages 80, 84, 88 and 90. Bolt passage 88 may be internally threaded to mater with external threads on the bolt so that the housing front and rear walls and peripheral wall, power wall 46 and booster load carrying member 60 may be preassembled. The master cylinder assembly 22 may also be attached to load carrying member 60 of the booster by suitable mounting bolts 104 and 106 as part of the preassembly operation. The power brake assembly 18 is then mounted on the vehicle body panel 58 by passing the threaded ends of the bolts 94, 96, 98 and 100 through their respective bolt passages 90 in panel 58. Suitable lock nuts 108 are then threaded over the bolt ends to secure assembly 18 on the assembly mount formed by panel 58.

FIG. 3 illustrates a similar booster arrangement in which two power walls 146 and 148 are provided which are similar in the construction to power wall 46. The housing of the booster of FIG. 3 has an additional wall 134 positioned axially intermediate the front wall 34 and the rear wall 36. Two sets of defined differential chambers are therefore provided, as is well known in the art. The center wall 134 is provided with bosses 182 and is of a similar construction to the booster front wall of FIG. 1 with suitable provisions being made through boss 182 for the receipt of the load carrying bolts 194. In production, common elements may be used to construct the single diaphragm booster of FIG. 1 or the tandem diaphragm booster of FIG. 2 with the addition of the center wall 134, the second power wall 148, a modified piston and valve assembly 140, and longer bolts 194. Many common elements, and in particular the booster load carrying members, may be used with boosters of different diameter, it only being necessary to extend the housing wall bosses 82, 86 and 182 radially outward so that they continue to mate with the load carrying member 60.

The boosters of FIGS. 1 and 3 are illustrated as being vacuum suspended boosters wherein the constant pressure chambers are usually at a predetermined vacuum pressure and the variable pressure chambers having atmospheric air admitted thereto under control of the valve portion of the piston and valve assembly, as is well known in the art. Upon booster reaction, the booster output member 42 transmits boosted force to the master cylinder to move the pressurizing pistons therein and pressurize brake fluid. The reaction force from the master cylinder housing is transmitted to the booster load carrying member 60 and thence through the load carrying bolts 94, 96, 98 and 100 to the booster load carrying member formed by the body panel 58.

None of this booster load force is required to be carried by the housing 32. Therefore the housing components may be made of a light weight material being of such a strength as to support the differential pressures acting across the housing walls, but they are not required to be sufficiently strong to act as booster load carrying members. The housing wall components may therefore be made of a suitable plastic or a light weight metal and so contribute to the overall booster construction wherein a net weight reduction is obtained without any loss of strength where needed.

The embodiments of the invention in which an exclusive property or privilege is claimed are defined as follows:

1. A brake booster comprising:
   a housing defining at least one constant pressure chamber and at least one variable pressure chamber and having power wall means separating said chambers and movable in said housing;
   said housing having a first housing section defining a first housing side wall forming a side of one of said chambers, a second housing section defining a second housing side wall forming a side of another of said chambers and also forming at least a substantial part of a circumferentially extending housing wall joining said first and second housing side walls;
   a first booster load carrying member providing axially oriented load carrying support for said first housing side wall over substantially all of the axially facing exterior surface area of said first housing side wall;
   a second booster load carrying member providing axially oriented load carrying support for said second housing side wall and having a plurality of generally radially directed kload carrying arms, each of said arms having its outer end position radially beyond the maximum radius of said pressure chambers in a circumferentially spaced location;
   said first and second housing sections having bosses in axial alignment with said load carrying arm outer ends at said circumferentially spaced locations, said bosses and said load carrying arm outer ends and said first load carrying member having aligned bolt-receiving passages formed therethrough;
   and load carrying bolts extending through said passages and carrying booster loads between said first and second load carrying members and holding said housing sections and said power wall means together in sealed relation, one of said load carrying members providing a secure mount for said booster using said load carrying bolts as booster mounting bolts.

2. A brake booster adapted to be mounted on and reinforced by a vehicle panel, said booster comprising:
   a housing defining a constant pressure chamber and a variable pressure chamber and having power wall means separating said chambers and movable in said housing;
   said housing defining a first housing section defining a first housing side wall of light weight material forming a side of one of said chambers, a second housing section defining a second housing side wall of light weight material forming a side of the other of said chambers, one of said housing sections also defining a circumferentially extending housing wall joining said first and second housing side wall;
   booster load transmission means having generally radially directed load carrying portions, each of said portions being reinforced alons said second housing side wall to compensate for any loss of strength due to the light weight material of said second housing side wall, and each portion having its outer end positioned radially beyond the maximum radius of said pressure chambers in circumferentially spaced locations around said housing;
   said first and second housing sections having bosses at said circumferentially spaced locations in axial alignment with the respective outer ends of each of said load carrying portions, said bosses and said outer ends respectively having aligned bolt-receiving passages formed therethrough;
   and load carrying bolts extending through said passages and carrying booster loads from said second housing side wall through said booster load transmission means to said first housing side wall and holding said power wall means in sealed relation with said first and second housing sections to complete said housings, said load carrying bolts extending beyond said complete housing for secure attachment to said vehicle panel and oriented with respect to said first housing side wall to place said vehicle panel in an axially oriented surface reinforcing relationship to said first housing side wall, said vehicle panel extending throughout the major radial part of said first housing side wall from the outer circumference thereof inwardly when the housing of said brake booster is attached to said vehicle panel so as to compensate for any loss of strength due to the light weight material of said first housing side wall.

3. In a differential pressure actuated power brake booster having a master cylinder mounted thereon for actuation and support and cooperating therewith to define a power brake assembly, an assembly mount supporting said power brake assembly in a vehicle for controlled operation by a vehicle operator, said booster including a booster housing defined by peripheral and side housing wall means, power wall means movably mounted in said booster housing within said housing wall means and cooperating with said housing wall means to define differential pressure chambers, and booster output means connecting said power wall means and said master cylinder in actuating and release force transmitting relation, the pressures in said differential pressure chambers selectively acting across said power wall means to generate boosted master cylinder actuating formce, the improvement comprising:

said housing wall means being light in weight and having strength sufficient to support the differential pressures thereacross but having insufficient strength to act as booster load carrying members which receive and transmit reaction force from said master cylinder to said assembly mount and which support said master cylinder on said assembly mount;

said booster having separate booster load carrying members comprising:

a first booster load carrying member in substantially full surface engagement with one of said side housing wall means and by such engagement providing substantially full surface axial reinforcement to said one side housing wall means, said first booster load carrying member being formed by said assembly mount, a second booster load carrying member in juxtaposition with another of said side housing wall means and having said master cylinder securely mounted thereon, and a third booster load carrying member defined by a plurality of bolt means connecting said first and second booster load carrying members and transmitting booster loads therebetween, said housing wall means including bosses thereon positioned outside the maximum radial extension of said chambers and having bolt passages therethrough receiving said bolt means therethrough, said bolt means providing the means securing said power brake assembly to said assembly mount, whereby said housing wall means are not required to carry booster loads between said master cylinder and said assembly mount and all booster load carrying members are positioned outside said differential pressure chambers.

* * * * *